United States Patent Office 3,227,967

Patented Jan. 4, 1966

3,227,967

ARRANGEMENT FOR THE ELECTRONICALLY CONTROLLABLE WOBBLING OF AN OSCILLATORY CIRCUIT

Martin Ebisch, Munich, Germany, assignor to Siemens & Halske Aktiengesellschaft, Berlin and Munich, Germany, a corporation of Germany Filed Sept. 26, 1962, Ser. No. 226,418
Claims priority, application Germany, Sept. 29, 1961, S 76,056
5 Claims. (Cl. 331—178)

The present invention relates to an arrangement for the electronically controllable wobbling of an oscillatory circuit. Such arrangements, which are required for instance in the automatic measurement art for the automatic periodic wobbling of a measurement frequency through the frequency range which is of interest for the object being measured, are already known in various embodiments.

Thus, for instance, it is known to control the value of the inductance of an oscillatory circuit by placing a ferromagnetic core associated with it under the influence of a magnetic induction of variable magnitude. This principle of control has, however, the disadvantages of relative great susceptibility to stray magnetic pick-up, high dependence of the tuned frequency on the temperature and resultant errors in coincidence caused by hysteresis phenomena upon variation of the frequency in opposite directions. With the known reactance tubes for controlling the tuned frequency of oscillatory circuits, large frequency displacements or swings can generally not be obtained. Furthermore, these systems do not have a sufficiently good frequency stability in case of small and very small frequency swings.

A known arrangement for electronically controlling the resonance frequency of an oscillatory circuit which avoids the disadvantages of such arrangements is characterized by the fact that two semi-conductor diodes or diode groups having a barrier layer capacitance, dependent upon the voltage, which are series connected in opposition to one another and in parallel to an oscillatory-circuit inductance, are fed via a tap of the oscillatory coil inductance with a blocking, preferably stabilized bias voltage, the other terminal of which, is connected via a voltage path to the connecting point of the diodes, and that an additional control voltage of variable amplitude and polarity is impressed upon said voltage path.

The latter arrangement affords the advantage that the resonance frequency of the oscillatory circuit defined by the control voltage O is substantially independent in magnitude on variations in amplitude of the high frequency voltage exciting the oscillatory circuit. Variations in temperature also have no noticeable influence on the constancy of the center frequency.

In the last mentioned arrangement the control potential and the resulting resonance frequency of the oscillator stand in a non-linear relation to each other. Also with an automatic and periodic frequency modulation or wobbling of the oscillator by use of, for example, a sawtooth-shaped control voltage, the resulting resonance frequency stands in a non-linear relation to the control voltage amplitude. The invention is directed to the elimination of this problem, in an arrangement of the last mentioned type, whereby the control voltage generator with a time linear output voltage is so distorted in a distortion device that there is assured a linear dependence between the amplitude of the output voltage mentioned and the frequency of the oscillator. Hereby it is achieved that a control voltage generator with time linear output voltage can be used and that despite this relatively simple curve form, the resulting resonance frequency is, at any time, proportional to the voltage amplitude. In a known arrangement of this general type ("Electronics," Aug. 21, 1959, pp. 38 to 40) a distortion circuit for the control voltage is provided which consists of a parallel switching of several circuit branches, of which each has a biased diode in series with an ohmic resistance. With this distortion circuit, however, only a relatively small frequency range can be swept. Through the arrangement according to the present invention there is achieved a considerable extension of the frequency range.

The present invention relates to an arrangement for wobbling the resonance frequency of an oscillatory circuit with a control voltage, comprising two opposed semiconductive capacitor means shunted across an oscillatory circuit inductance, means for applying to a tap of said inductance and to the junction point of said semi-conductive capacitor means a bias voltage and a control voltage of variable amplitude and polarity, a control voltage generator for producing an output voltage varying in amplitude and polarity with a linear time function and a distortion device connected between said control voltage generator and said junction point for distorting said output voltage such as to form the said control voltage, said distortion device comprising a voltage divider, a first divider resistor which is shunted by a first resistance network via a first diode switch connected in blocking direction with respect to positive polarity of said output voltage and a second divider resistor thereof, lying in parallel to the output of said distortion device, being shunted by a second resistance network via a second diode switch connected in a forward direction, said first and second resistance networks both having resistance values decreasing with the increasing amplitude of the said output voltage.

The various advantages and features of the invention will be explained more in detail in the following description of a preferred embodiment which is rendered below with reference to the drawing.

Figure 1:
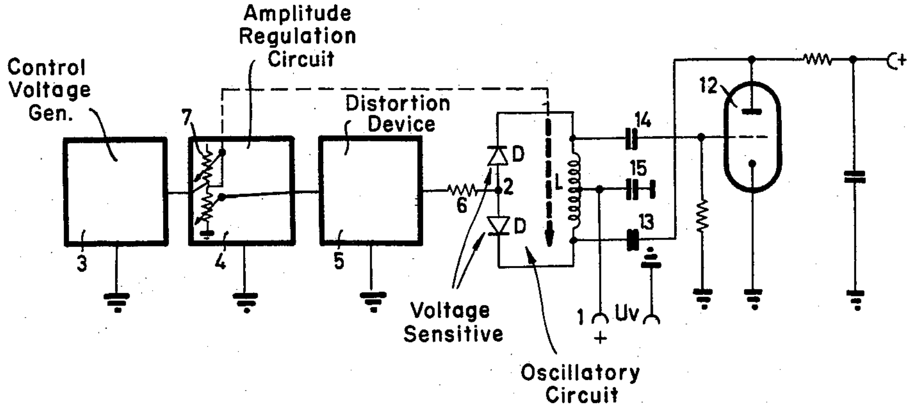
FIG. 1 shows a circuit combination in which the arrangement in accordance with the invention is used as the frequency determining circuit part of a vacuum tube generator in an autodyne circuit.

In FIG. 1 the oscillatory circuit which is to be wobbled comprises the inductance L and semiconductor diodes D which have a barrier layer capacitance which is dependent on the voltage, and are connected one behind the other with opposite polarity in parallel to the inductance and serve as voltage-dependent capacitors. In this connection, both semiconductor diodes D may also be replaced by correspondingly polarized groups of diodes connected in parallel or in series to each other. Via the terminal 1, a bias voltage $U\nu$ which fully modulates one of the diodes D in blocked condition is fed preferably to the electric center point of L, the other pole of the source of bias voltage being at reference potential. The wobbling of the oscillatory circuit takes place as a function of the control voltage U which is supplied by a control voltage generator 3, and after passing through a regulation stage 4, and a distortion device 5 is impressed on the voltage path leading from the reference terminal of the source of bias voltage to the connecting point 2 of the diodes in such a manner that it is superimposed on the bias voltage $U\nu$. The control voltage is in this connection in particular automatically and periodically variable in amplitude and polarity.

The value of the blocking diode bias voltage $U\nu$ is preferably so selected that at the control voltage O, there is set precisely that tuned frequency F3 of the oscillatory circuit which lies in the center of the frequency range F1–F2 to be wobbled.

Figure 2:
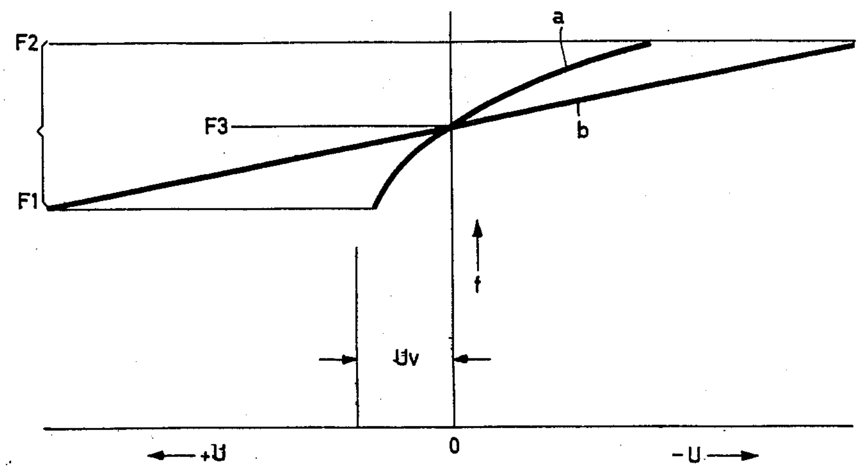
FIG. 2 is a graph showing the dependence of the tuning frequency on the control voltage.

This is shown in the diagram of FIG. 2, which represents the variation of the tuned frequency *f* on the control voltage U. As can be noted further from FIG. 2, there exists between F and U the dependence shown by curve *a* which corresponds approximately to proportionality between *f* and the fourth root of U. The linear relationship represented by curve *b* in FIG. 2 is obtainable when the control voltage U is influenced in the distortion device 5 in such a manner that with positive control voltage values, it is progressively regulated in downward direction with an increase in the amplitude, and with negative control voltage values, is progressively regulated upward with an increase in amplitude.

While the diode bias voltage U*v* fed at 1 preferably has the value necessary for adjustment to the center F3 of the wobbling range, and thus determines the effective diode capacitance corresponding to this center frequency F3, the center frequency in itself can be adjusted by varying the inductance L which for this purpose is preferably developed as a variometer coil. In this connection, it is advisable to regulate the amplitude of the control voltage in the control stage 4 as a function of the setting of the variometer coil by means of a setting member 7 in such a manner that the control swing which otherwise would be the same size relative to the corresponding center frequency is maintained substantially constant. In this way, there is assured a constant width of the frequency range through which wobbling can be effected independently of the specific center frequency.

As can be noted from the showing of FIG. 1, the diodes D are polarized in opposite direction with respect to the high frequency voltage exciting the oscillatory circuit. Upon variations in amplitude of the high frequency voltage, therefore, the effective capacitance of the one diode will become larger and that of the other smaller. In this way, there is obtained a compensating of the resultant variations in capacitance, so that such variations in amplitude only have a slight influence on the center frequency. Furthermore, the blocking bias voltage U*v* is fed solely via the inductance L and the relatively low-ohmic path from the pole of the source of bias voltage, lying at the reference potential, to the connecting point 2 so that changes in the transmission properties of the circuit parts conducting the control voltage which are produced periodically or occur as a result of temperature variations cannot exert any influence on the bias voltage and thus on the center frequency F3. By the action of the control voltage at the connecting point 2 which lies—aside from small dysymmetries—at the reference potential with respect to high frequency, the decoupling resistor 6 can be selected so small that the time constant of the RC-member consisting of it and the capacitance of the diodes D connected in parallel for the control voltage does not distort the shape of the curve of the control voltage.

One suitable embodiment of the distortion device 5, the manner of operation of which has already been described above, is shown in FIG. 3.

Figure 3:
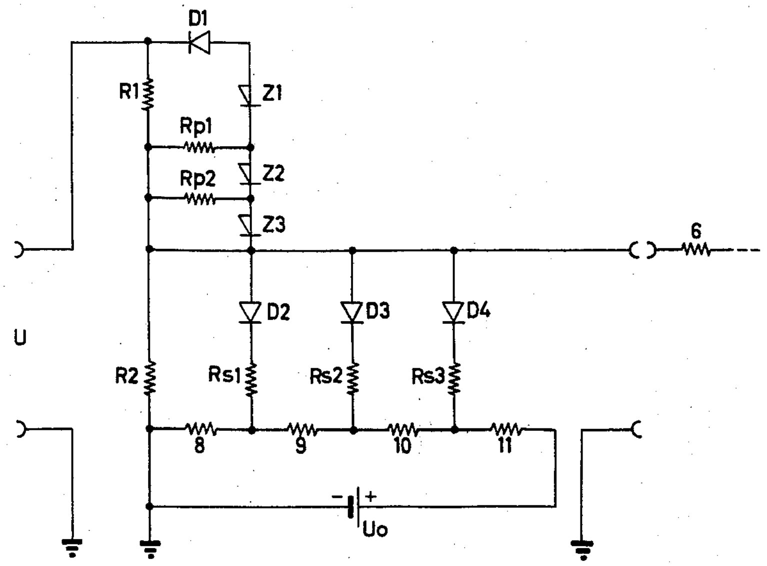
FIGS. 3 and 4 illustrate an embodiment of a distortion device employed.

In FIG. 3, a voltage divider comprising the resistors R1 and R2 is active for very small amplitudes of the control voltage, its voltage division ratio being preferably so selected that the slope of the curve *b* at the frequency F3 is so adjusted that it corresponds approximately to the smallest slope of the curve *a* (cf. FIG. 2). If the control voltage U increases toward negative voltage values, the switching diode D1 opens while the switching diodes D2, D3 and D4 remain blocked. Upon obtaining the breakdown voltage at the Zener diode Z1, R*p*1 is connected in parallel to R1. In this way, the voltage division ratio of R1:R2 is reduced. When the amplitude of the control voltage becomes larger, another resistor R*p*2 is first of all connected in parallel via the Zener diode Z2 and the resistor R1 is finally short-circuited via the Zener diode Z3. If the amplitude of the control voltage U increases to positive voltage values, then when the diode D1 is blocked, the voltage lying on R2 will, above a given threshold value, offset the bias voltage at the switching diode D2 supplied by U*o* via resistors 8, 9, 10 and 11 and connect D2. In this way, R2 is shunted by R*s*1 so that the voltage divider ratio R1:R2 is increased. Upon further increase in the control voltage D3 and finally D4 are connected and place R*s*2 and R*s*3 respectively parallel to R2.

By a corresponding increase in the number of the Zener diodes Z, resistors R*p*, diodes D and resistors R*s*, the characteristic curve of the distortion device 5 can be refined and any points of discontinuities eliminated. This, however, is obtained with less circuit components in the case of a distortion device such as shown in FIG. 4.

Figure 4:
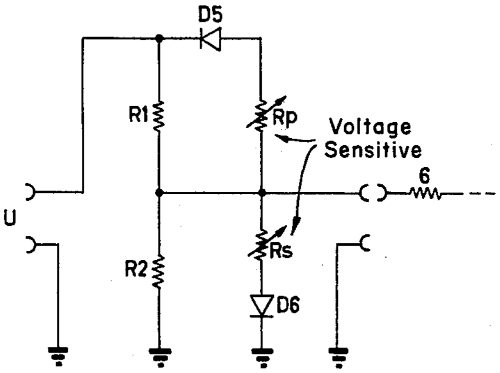

In FIG. 4, in case of negative control voltage U, a voltage-dependent resistor R*p* (known for instance under the trade-name "Varistor") is connected via the switching diode D5 in parallel to R1, the resistance of which decreases strongly with an increase in the amplitude. In case of positive control voltage, D6 connects the resistor R*s* which is dependent upon voltage in the same manner, in parallel to R2. By adjustable additional resistors connected in series to R*p* and R*s*, sample dispersions can in this connection be suitably counteracted.

Another embodiment of the distortion device 5 can be derived from the arrangement shown in FIG. 3, by employing instead of the resistors R*p*1, R*p*2, etc., R*s*1, R*s*2 etc., voltage-dependent resistors R*p* and R*s* in accordance with FIG. 1.

In the embodiment of the distortion device shown in accordance with FIGS. 3 and 4, the voltage path connecting the terminal, at reference potential, of the source of bias voltage U*v* with the connecting point 2 passes in each case over the divider resistor R2 and the subsequent decoupling resistor 6, in which connection a certain part of the control voltage U also occurs simultaneously as impressed voltage at R2.

In FIG. 1, the arrangement in accordance with the invention is employed as a frequency-determining circuit part of a vacuum tube generator 12 in autodyne circuit which can be used as wobbling transmitter. In this connection, the oscillatory circuit inductance L is connected via coupling capacitors 13 and 14 to the anode and to the grid of the tube, the cathode of which is at reference potential. The electric centerpoint 1 of L is connected via the capacitor 15 from the standpoint of alternating current to the reference potential. In this connection it should be pointed out that by the feeding, in accordance with the invention, of the blocking diode bias voltage U*v*, and the control voltage U, which is to be considered wobbling voltage, there is obtained the important advantage that the wobbling voltage can be so influenced in the distortion device 5 that the wobbling swing is made linear while the frequency stability of the wobbling oscillator is not influenced by the properties of the distortion device 5 thereof.

With suitable dimensioning of the distortion device 5, one can obtain, in addition to the linear dependence described of the control voltage U and frequency *f*, any other desired relationship, for instance a logarithmic relationship.

Changes may be made within the scope and spirit of the appended claims which define what is believed to be new and desired to have protected by Letters Patent.

I claim:

1. An arrangement for wobbling the resonance frequency of an oscillator circuit with a control voltage, comprising two opposed semi-conductive capacitor means shunted across an oscillator circuit inductance, means for applying to a tap of said inductance and to the junction point of said semi-conductive means a bias voltage and a control voltage of variable amplitude and polarity, a control voltage generator for producing an output voltage varying in amplitude and polarity with a linear time function and a distortion device connected between said control voltage generator and said junction point for distorting said output voltage such as to form the said control voltage, said distortion device comprising a voltage divider, a first divider resistor which is shunted by a first resistance network via a first diode switch connected in blocking direction with respect to positive polarity of said output voltage, and a second divider resistor thereof, lying in parallel to the output of said distortion device, being shunted by a second resistance network via a second diode switch connected in a forward direction, said first and second resistance networks both having resistance values decreasing with the increasing amplitude of the said output voltage.

2. Arrangement according to claim 1, wherein said first resistance network comprises a series of resistances shunted across one another via Zener diodes, which are connected in a forward direction with respect to positive polarity of said output voltage, and said second resistance network comprises a series of circuits shunted across one another, each of said circuits containing a resistance and a diode connected in series to one another, said Zener diodes and said diodes having conduction points differing from one another.

3. An arrangement according to claim 2, wherein oscillatory circuit inductance is a variometer coil, and wherein an amplitude regulation circuit is interposed between the said control voltage generator and said distortion device, said variometer coil being adjustable together with the amplitude regulation circuit such as to vary the amplitude of said output voltage as a function of the variation of said variometer coil whereby the variable frequency range is held constant in its absolute value.

4. An arrangement according to claim 1, wherein said first resistance network comprises a first voltage dependent resistor and said second resistance network comprises a second voltage dependent resistor, the values of said first and second resistors decreasing with an increase of the said output voltage.

5. An arrangement according to claim 4, wherein the oscillatory circuit inductance is a variometer coil, and wherein an amplitude regulation circuit is interposed between the said control voltage generator and said distortion device, said variometer coil being adjustable together with the amplitude regulation circuit such as to vary the amplitude of said output voltage as a function of the variation of said variometer coil whereby the variable frequency range is held constant in its absolute value.

References Cited by the Examiner

UNITED STATES PATENTS 3,050,693 8/1962 Sinninger ---------- 332—30 X

OTHER REFERENCES

"Oscillator Design Using Voltage-Variable Capacitors," by Brady in Electronics, August 21, 1959, pages 38–40.

ROY LAKE, *Primary Examiner.*

JOHN KOMINSKI, *Examiner.*